(12) United States Patent
Rippel et al.

(10) Patent No.: US 11,849,128 B2
(45) Date of Patent: Dec. 19, 2023

(54) DYNAMIC CONTROL FOR A MACHINE LEARNING AUTOENCODER

(71) Applicant: WaveOne Inc., Palo Alto, CA (US)

(72) Inventors: Oren Rippel, Mountain View, CA (US); Lubomir Bourdev, Mountain View, CA (US)

(73) Assignee: WAVEONE INC., Palo Alto, CA (US)

( * ) Notice: Subject to any disclaimer, the term of this patent is extended or adjusted under 35 U.S.C. 154(b) by 833 days.

(21) Appl. No.: 16/518,647

(22) Filed: Jul. 22, 2019

(65) Prior Publication Data

US 2020/0034709 A1 Jan. 30, 2020

Related U.S. Application Data

(60) Provisional application No. 62/703,361, filed on Jul. 25, 2018.

(51) Int. Cl.
*H04N 19/42* (2014.01)
*G06N 3/08* (2023.01)
(Continued)

(52) U.S. Cl.
CPC .......... *H04N 19/42* (2014.11); *G06F 18/214* (2023.01); *G06N 3/08* (2013.01); *G06V 10/774* (2022.01);
(Continued)

(58) Field of Classification Search
CPC ........ G06N 3/08; G06N 3/0454; G06N 3/084; G06N 20/00; G06N 20/20; G06K 9/6256;
(Continued)

(56) References Cited

U.S. PATENT DOCUMENTS 6,789,123 B2 * 9/2004 Li ........................... H04L 65/70
370/235
10,504,005 B1 12/2019 Walters et al.
(Continued)

OTHER PUBLICATIONS

Zhu et al., "DeepLung: Deep 3D Dual Path Nets for Automated Pulmonary Nodule Detection and Classification", 2018, IEEE (Year: 2018).*

(Continued)

*Primary Examiner* — YuJang Tswei
(74) *Attorney, Agent, or Firm* — BakerHostetler (57) ABSTRACT

An autoencoder is configured to encode content at different quality levels. The autoencoder includes an encoding system and a decoding system with neural network layers forming an encoder network and a decoder network. The encoder network and decoder network are configured to include branching paths through the networks that include different subnetworks. During deployment, content is provided to the encoding system with a quality signal indicating a quality at which the content can be reconstructed. The quality signal determines which of the paths through the encoder network are activated for encoding the content into one or more tensors, which are compressed into a bitstream and later used by the decoding system to reconstruct the content. The autoencoder is trained by randomly or systematically selecting different combinations of tensors to use to encode content and backpropagating error values from loss functions through the network paths associated with the selected tensors.

26 Claims, 10 Drawing Sheets

(51) Int. Cl.
*H04N 19/182* (2014.01)
*H04N 19/517* (2014.01)
*G06V 20/40* (2022.01)
*G06F 18/214* (2023.01)
*G06V 10/774* (2022.01)
*G06V 10/82* (2022.01)
*G06N 3/084* (2023.01)
*G06N 20/20* (2019.01)
*G06F 11/00* (2006.01)
*G06N 20/00* (2019.01)

(52) U.S. Cl.
CPC .............. *G06V 10/82* (2022.01); *G06V 20/46* (2022.01); *H04N 19/182* (2014.11); *H04N 19/517* (2014.11); *G06F 11/00* (2013.01); *G06N 3/084* (2013.01); *G06N 20/00* (2019.01); *G06N 20/20* (2019.01)

(58) Field of Classification Search
CPC ...... G06V 20/46; G06V 10/82; H04N 19/182; H04N 19/517; H04N 19/42; G06F 11/00
See application file for complete search history.

(56) References Cited

U.S. PATENT DOCUMENTS

| | | | | |
|---|---|---|---|---|
| 2003/0125933 | A1* | 7/2003 | Saunders | G11B 20/00007 704/201 |
| 2006/0050978 | A1* | 3/2006 | Lin | H04N 19/503 375/E7.263 |
| 2007/0280700 | A1* | 12/2007 | Remedios | H04J 14/0227 398/183 |
| 2010/0322527 | A1* | 12/2010 | Fablet | G06T 9/00 382/232 |
| 2013/0204664 | A1 | 8/2013 | Romagnolo et al. | |
| 2014/0068692 | A1 | 3/2014 | Archibong et al. | |
| 2017/0017886 | A1 | 1/2017 | Gao et al. | |
| 2018/0075338 | A1* | 3/2018 | Gokmen | G06N 3/08 |
| 2018/0120843 | A1* | 5/2018 | Berntorp | G06N 3/08 |
| 2018/0139450 | A1 | 5/2018 | Gao et al. | |
| 2018/0227585 | A1* | 8/2018 | Wang | H04N 19/192 |
| 2019/0012581 | A1* | 1/2019 | Honkala | G06N 3/0472 |
| 2019/0095946 | A1 | 3/2019 | Azout et al. | |
| 2019/0124346 | A1 | 4/2019 | Ren et al. | |
| 2019/0124349 | A1* | 4/2019 | Kuusela | H04N 19/176 |
| 2019/0332900 | A1* | 10/2019 | Sjolund | G06T 9/001 |
| 2020/0145661 | A1* | 5/2020 | Jeon | H04N 19/136 |

OTHER PUBLICATIONS

Jeremy Kerfs, "Models for pedestrian trajectory prediction and navigation in dynamic environments", 2017, California Polytechnic State University (Year: 2017).*

Vergari et al., "Sum-Product Autoencoding: Encoding and Decoding Representations Using Sum-Product Networks", 2018, Association for the Advancement of Artificial Intelligence (Year: 2018).*

Kaminsky et al., "TCM decoding using neural networks", 2003, Elsevier Ltd (Year: 2003).*

* cited by examiner

DYNAMIC CONTROL FOR A MACHINE LEARNING AUTOENCODER

CROSS REFERENCE TO RELATED APPLICATIONS

This application claims the benefit of provisional U.S. Application No. 62/703,361, filed on Jul. 25, 2018, the contents of which is incorporated herein by reference in its entirety.

BACKGROUND

This invention generally relates to encoding and decoding content, and more specifically to configuring an autoencoder to encode and decode content at different quality levels.

Various online systems transmit information to and from one another over a network. The information may be, for example, content such as an image or video, or a string of text such as an e-mail or word document. Typically, the sender encodes the information into a compressed bitstream such that the compressed bitstream can be efficiently transmitted to the receiver. The receiver can then decode the compressed bitstream to reconstruct the original information. For example, responsive to a request to download a particular image from a client device, an image sharing website may encode the image and transmit the compressed bitstream to the client device.

Although the complexity of input content may vary, neural network structures, as may be used in an autoencoder, have a fixed bottleneck capacity. Neural networks with smaller bottlenecks are more optimal for use on simple content, such as simple image frames, and networks with larger bottlenecks are more suitable for more complex content.

SUMMARY

A compression system trains a machine-learned autoencoder, which includes an encoding system and a decoding system. The encoding system can be deployed to encode content for transmission to a system with a corresponding decoding system which can be deployed to reconstruct an approximation of the original content.

The autoencoder is configured in a multiplexer format in which an encoding network and a decoding network include sub-networks that are coupled in a branching structure. The encoding system is trained to produce a plurality of tensors for encoding content, such as images, video, audio, text, and so forth. Some sub-networks of the encoding system and the decoding system are used in all cases to encode and decode the tensors, while other sub-networks in the branching structure may only be used in association with producing and decoding certain of the plurality of tensors.

The bottleneck of the autoencoder may thus be adjusted such that the same autoencoder can use a smaller bottleneck for encoding simple content and a larger bottleneck for encoding complex content. During training, a quality signal is provided to indicate which of the paths through the branching structure should be used to encode training content and to generate loss function values. Loss function values may include reconstruction loss related to a dissimilarity detected between the reconstructed content and the training content, and bit-length loss related to the length of a compressed bitstream that includes tensor information. During a backpropagation step, parameters of the sub-networks along the selected paths are adjusted based on the loss values. The autoencoder is trained using different combinations of tensors to encode the content (i.e., using different combinations of paths through the branching structure).

During deployment, the encoding system receives content to encode as well as a quality signal indicating a minimum required quality of the reconstruction of the content. The encoding system uses an appropriate combination of the tensors to encode the content and compresses the tensor data into a bitstream.

To reconstruct the content, a decoding system decompresses the bitstream, and provides the one or more tensors from the bitstream to the appropriate sub-networks for decoding. The decoding network produces a reconstructed version of the content.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text may refer to reference numerals "client device 110A" and/or "client device 110B" in the figures).

DETAILED DESCRIPTION

Figure 1A:
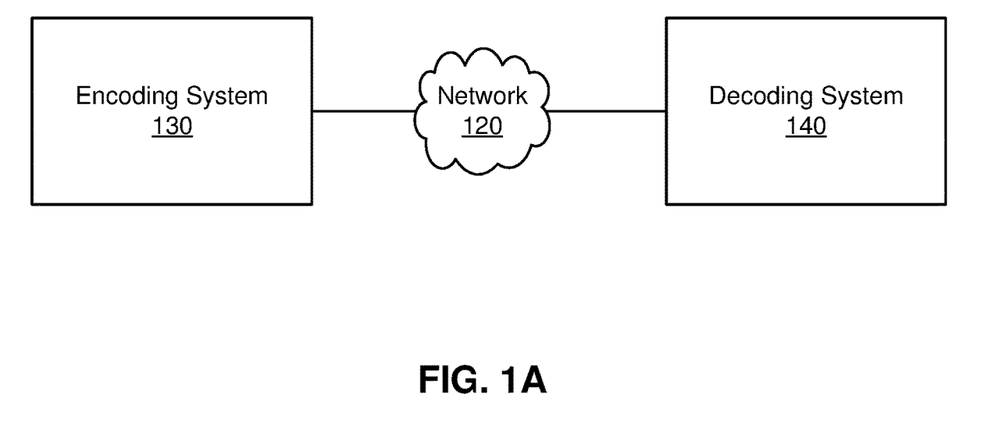
FIG. 1A is a high-level block diagram of a system environment including an encoding system and a decoding system interacting over a network, in accordance with an embodiment.
Figure 1B:
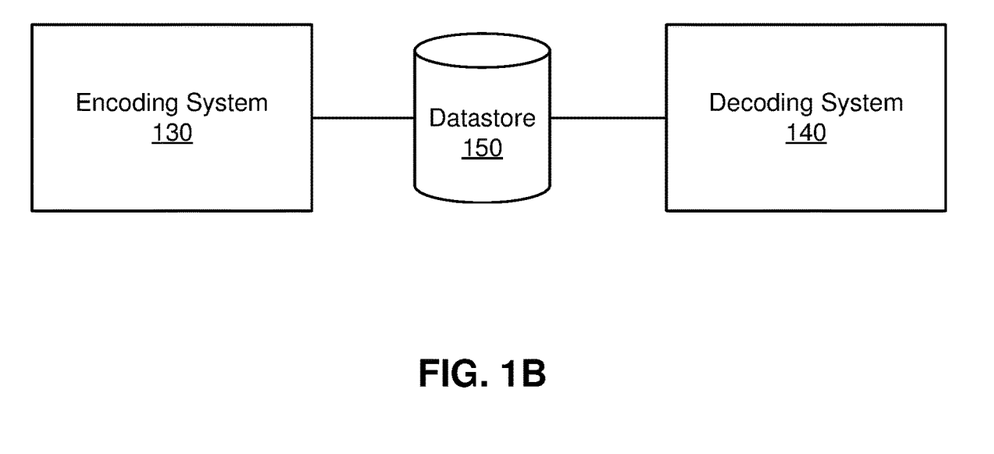
FIG. 1B is a high-level block diagram of a system environment including an encoding system and a decoding system interacting via a datastore, in accordance with an embodiment.

FIG. 1A is a high-level block diagram of a system environment including an encoding system and a decoding system interacting over a network, in accordance with an embodiment. The system environment shown in FIG. 1A comprises an encoding system 130, a decoding system 140, and a network 120. In alternative configurations, different and/or additional components may be included in the system environment. For example, FIG. 1B is a high-level block diagram of a system environment including an encoding system and a decoding system interacting via a datastore, in accordance with another embodiment.

The encoding system 130 trains and implements a machine-learned encoder through an autoencoder architecture. The encoding system 130 can be deployed to encode content for transmission to a decoding system 140. The encoder is configured to receive content and output a compact bitstream representation of a tensor that represents the content. The content may be, for example, images, videos, or text. Throughout this document, still images are used as an example content type. In some cases, such as in the case of encoding video, the encoding system may be trained to use different input types. For example, to encode a series of video frames, the encoding system may accept state information related to information from prior video frames in addition to the frame itself. Video encoding is further described in U.S. patent application Ser. No. 16/183,469, filed on Nov. 7, 2018, which is hereby incorporated by reference in its entirety.

The decoding system 140 trains and implements a machine-learned decoder through the autoencoder architecture. The decoding system 140 can be deployed to decode content received from the encoding system 130. The decoder is configured to receive a bitstream including a compact representation of a tensor representing the content and to output a reconstructed version of the content.

In the example of FIG. 1A, the bitstream may be transferred from the encoding system 130 to the decoding system 140 via the network 120. The network 120 may comprise any combination of local area and wide area networks employing wired or wireless communication links. In some embodiments, all or some of the communication on the network 120 may be encrypted.

In some cases, a bitstream may be sent directly over the network 120 from the encoding system 130 to the decoding system 140. As one example, a video messaging system may employ the encoding system 130 to compress the message content and may send the message over the network 120 to the decoding system 140 at a client device of a recipient user in near real time.

In other cases, the bitstream data may be used as a way to store the content in a compressed manner until it is needed at a later time. The example of FIG. 1B includes the encoding system 130, the decoding system 140, and a datastore 150. In some embodiments, the output of the encoding system 130 may be stored in one or more datastores 150 until the decoding system 140 retrieves the bitstream to decode the content.

In one embodiment, the encoding system 130 and decoding system 140 include components that are configured to form a multiplexer network that can limit the amount of tensor data (i.e., control the bottleneck) in response to a quality control signal. The encoding system 130 may receive, in addition to a piece of content, a quality control signal value that indicates tensors that should be used for encoding and decoding the content. A neural network used by the encoding system 130 to generate the tensors may include a plurality of sub-networks configured in a branching structure. In one embodiment, the network is configured such that some network components are shared by all paths through the network and such that other paths through the network are limited to certain sub-networks. Sharing components leads to improved memory and lower numbers of required parameters, while having branches of sub-networks that are only used in some instances improves compression performance and allows the network to tune weights associated with different tensors to be output for compression into a bitstream.

During deployment, the complexity of the input content is evaluated. For example, the complexity of input may be evaluated as a function of a minimum bitrate that is required to reconstruct the content with a minimum desired quality level. The appropriate paths through the network are chosen according to the determined complexity. Thus, content that needs to be reconstructed with a high quality level might use all paths through the network and the resulting bitstream may be generated from a set of multiple output tensors. The same encoding system 130 can also encode content that does not need to be reconstructed at a high quality level, for example, by using a subset of the output tensors to generate the bitstream of encoded data.

In one embodiment, codelayers in the multiplexer network may be configured to use an adaptive quantization technique to further encode tensor values. Adaptive quantization is further described in U.S. patent application Ser. No. 16/356,201, filed on Mar. 18, 2019, which is hereby incorporated by reference in its entirety.

Figure 2A:
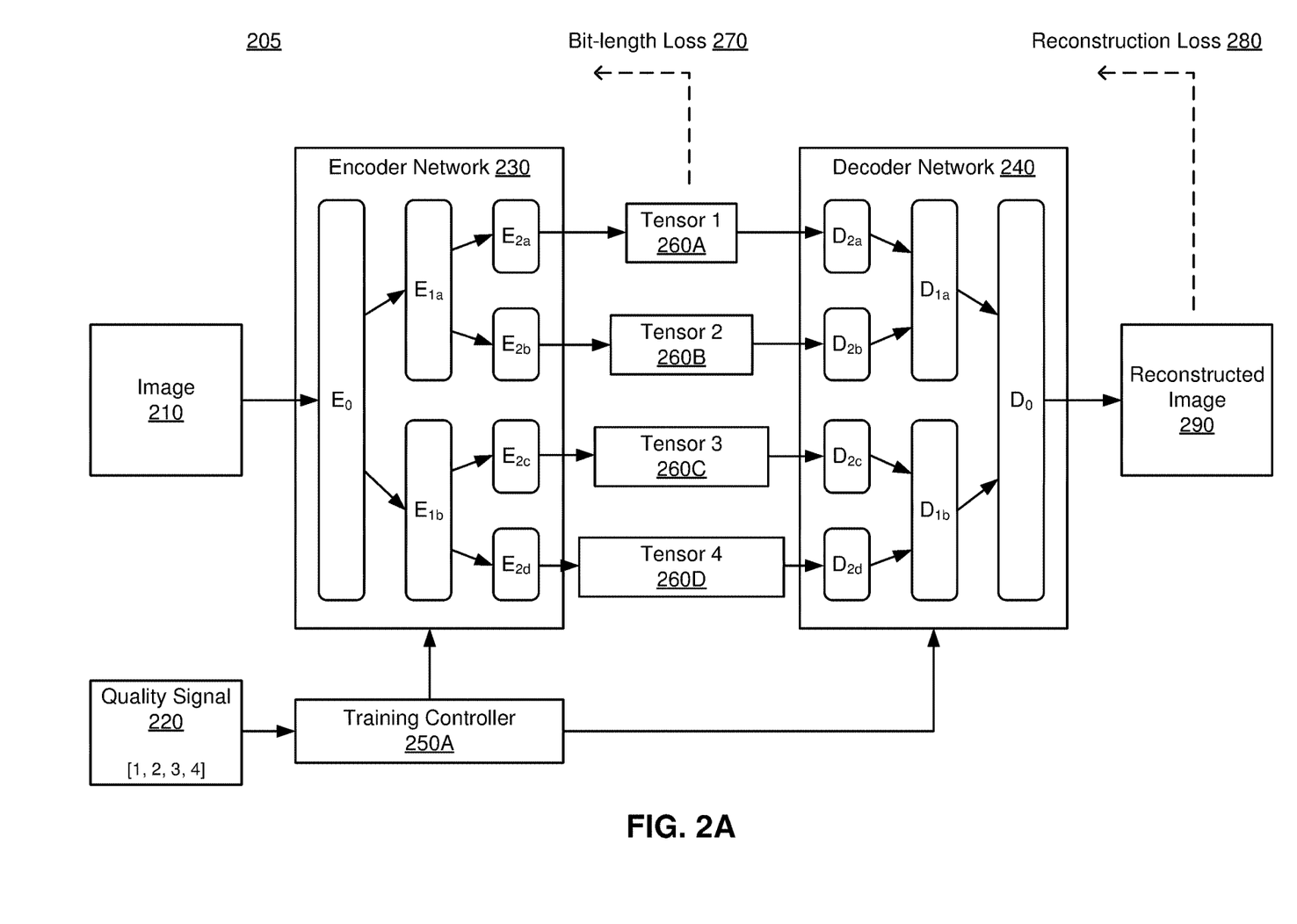
FIG. 2A illustrates a process for training an autoencoder, in accordance with an embodiment.

FIG. 2A illustrates a process for training an autoencoder 205, in accordance with an embodiment. The autoencoder 205 includes an encoder network 230 and a decoder network 240. The parameters for the encoder network 230 and the decoder network 240 are jointly trained through an autoencoder architecture in which the encoder network 230 and the decoder network 240 are coupled together. Specifically, the autoencoder 205 is coupled to receive content and output one or more tensors for the content by applying the encoder network 230 to the content. The autoencoder 205 outputs a reconstructed version of the content by applying the decoder network to the one or more tensors.

The encoder network 230 includes a plurality of sub-networks, organized in a branching structure, depicted in FIG. 2A as sub-networks $E_0$, $E_{1a}$, $E_{1b}$, $E_{2a}$, $E_{2b}$, $E_{2c}$, and $E_{2d}$. The decoder network similarly includes a plurality of sub-networks, depicted likewise in FIG. 2A as sub-networks $D_{2a}$, $D_{2b}$, $D_{2c}$, $D_{2d}$, $D_{1a}$, $D_{1b}$, and $D_0$. In other embodiments the encoder network 230 and decoder network 240 may have different numbers of sub-networks, and the sub-networks may be organized and connected in manners different from that depicted herein.

The encoder network 230 and decoder network 240 are trained using a set of training content, such as a set of images. In the example of FIG. 2A, an item of training content is represented by an image 210. The autoencoder 205 is trained using the set of training content to reduce one or more loss functions.

In one embodiment, the loss functions include a reconstruction loss 280. The reconstruction loss 280 represents a dissimilarity between the original image 210 and the reconstructed image 290. By training the encoder network 230 and the decoder network 240 through the autoencoder architecture, the parameters of the encoder network 230 are configured to output one or more tensors 260 for content that when synthesized by the decoder network 240, generates reconstructed content closely resembling the structure of the original content (e.g., a reconstructed image 290 that closely resembles the original image 210).

The autoencoder 205 reduces the reconstruction loss 280 by repeatedly iterating between a forward pass step and a backpropagation step. During the forward pass step, the autoencoder 205 generates a reconstructed image 290 by applying the autoencoder 205 with an estimated set of parameters to the training image 210. During the backpropagation step, a reconstruction loss 280 is determined based on dissimilarity between the reconstructed image 290 and the training image 210. The estimated set of parameters for the encoder network 230 and the decoder network 240 are repeatedly updated by backpropagating error terms obtained from the reconstruction loss function 280. This process is repeated until the reconstruction loss function 280 satisfies a predetermined criteria.

In one embodiment, the autoencoder 205 is further trained using a bit-length loss function 270 in addition to the reconstruction loss 280. The bit-length loss function 270 is determined based on a length of a compressed bitstream generated from the one or more tensors 260. That is, a bitstream generator (not shown in FIG. 2A) may be applied to the one or more tensors 260 produced by the encoder network to generate a bitstream that includes compressed information about the tensors 260. The bit-length loss 270 is repeatedly examined by the autoencoder 205 during training such that the length of the autoencoder 205 generates tensors that, when compressed into a bitstream, achieve a desired target bit-length. During the backpropagation step, the autoencoder 205 determines the bit-length loss 270 and the reconstruction loss 280 and the parameters of the decoder network 240 and the encoder network 230 are adjusted accordingly.

By including the bit-length loss function 270, the encoder network 230 can exploit the structure of the input content (i.e., image 210) to generate tensors 260 that reduce the length of the compressed bitstream when possible while achieving reasonable reconstruction fidelity. For example, content with a simple structure may be encoded using tensors 260 that can be compressed into a shorter bitstream than content with a complex structure. Including bit-length loss 270 allows the encoder network 230 to generate a tensor 260 that is compressible into a shorter bitstream when possible to exploit content with simple structures.

The sub-networks of the autoencoder 205 are organized into a multiplexer network. That is, the autoencoder 205 is configured and trained such that not all of the tensors 260 are required to reconstruct content. In particular, the autoencoder 205 is trained using various combinations of the different tensors 260. The amount of tensor 260 data that is compressed into the bitstream may be limited based on the required quality level of the reconstructed content 290, for example, by only utilizing a subset of the available tensors 260 to generate the bitstream. The example of FIG. 2A includes four tensors 260A, 260B, 260C, and 260D. The autoencoder 205 is trained such that it may encode and decode content information using one tensor 260 or using a combination of multiple tensors 260.

A quality signal 220 is provided as input to the autoencoder 205. The quality signal 220 indicates a minimum quality level at which the content should be reconstructed. During the training process, as shown in the example of FIG. 2A, the quality signal 220 may include an indication of which tensors 260 to use. For example, the quality signal of FIG. 2A indicates that all four tensors 260 should be used to generate the bit-length loss 270 and the reconstructed image 290. Thus, the autoencoder 205 will use all of the sub-networks in the encoder network 230 and in the decoder network 240 to encode and decode the image 210 and will adjust parameters for all of the sub-networks during backpropagation training steps. In alternate embodiments, a quality signal 220 may be provided in different formats. In one example embodiment, the quality signal 220 may be provided in the form of a quality tensor with a given height and width, wherein each element of the quality tensor corresponds to a spatial area of the input, and the value of the element indicates the quality associated with that area of the input, e.g., a quality level for encoding that area of the input.

In another embodiment, the quality signal 220 may be generated by the autoencoder 205 rather than provided as an input to the system. That is, in one embodiment, the encoding system 130 may include a trained model that predicts a quality signal 220 value to be used for encoding a given input. The encoding system 130 may be configured or trained to generate a quality signal 220 that will achieve a certain objective. For example, the encoding system 130 may be trained to select a target quality signal 220 value that will achieve some target quality of reconstruction (i.e., the quality signal 220 is determined such that it will minimize bandwidth needed to generate the encoding while also achieving the target quality of reconstruction). As another example, the encoding system 130 may be trained to select a target quality signal 220 value that will achieve a target bandwidth (i.e., the quality signal 220 is determined such that the quality of the reconstructed content will be maximized without exceeding a target bandwidth for the encoding).

In one embodiment, a training controller 250A controls which sub-networks should be used by the encoder network 230 and the decoder network 240 with a particular quality signal 220. In some embodiments, the training controller 250A may also provide information about the quality signal 220 to a bitstream generator to identify which tensors 260 to use in generating the bitstream for calculating the bit-length loss 270.

The autoencoder 205 is trained such that the tensors 260 that are output by the encoder network 230 will include adequate information to encode content such as an input image 210 when the tensors 260 are transmitted to the decoder network 240 individually or in combination. For example, during deployment if a quality signal 220 indicates that an image 210 should be encoded at a low quality, the encoding system 130 may be limited to using sub-networks of encoder network 230 that produce tensor 1 260A for encoding information about the image 210. If the quality signal 220 indicates that the image 210 should be encoded at a mid-level quality, the encoding system may be limited to using a subset of the available tensors 260. FIG. 2A depicts an example of training the autoencoder 205 to use all of the available tensors 260 (consequently training all of the sub-networks) to encode an image 210 at high quality. The sub-networks of the encoder network 230, and the decoder network 240 are trained accordingly in the training phase.

In some embodiments, during training, a subset of the tensors 260 is selected at random and the corresponding paths through the sub-networks that are associated with the selected tensors 260 is evaluated in the forward evaluation. During the backpropagation step, the same paths are followed back through the sub-networks to adjust the parameters in view of the bit-length loss function 270 and the reconstruction loss function 280. In another embodiment, a quality signal 220 may be provided to indicate which sub-networks (e.g., paths associated with tensor 1 260A, tensor 2 260B, tensor 3 260C, and tensor 4 260D) should be used to train the encoder network 230 and the decoder network 240. For example, a quality signal 220 for use in training may be provided along each of the input images 210 in the set of training content. As in the case of randomly selected tensors, the sub-networks along the paths that are indicated by the quality signal 220 are used during the forward evaluation and the same paths are followed during the backpropagation step to update the associated sub-network parameters based on the loss functions.

Figure 2B:
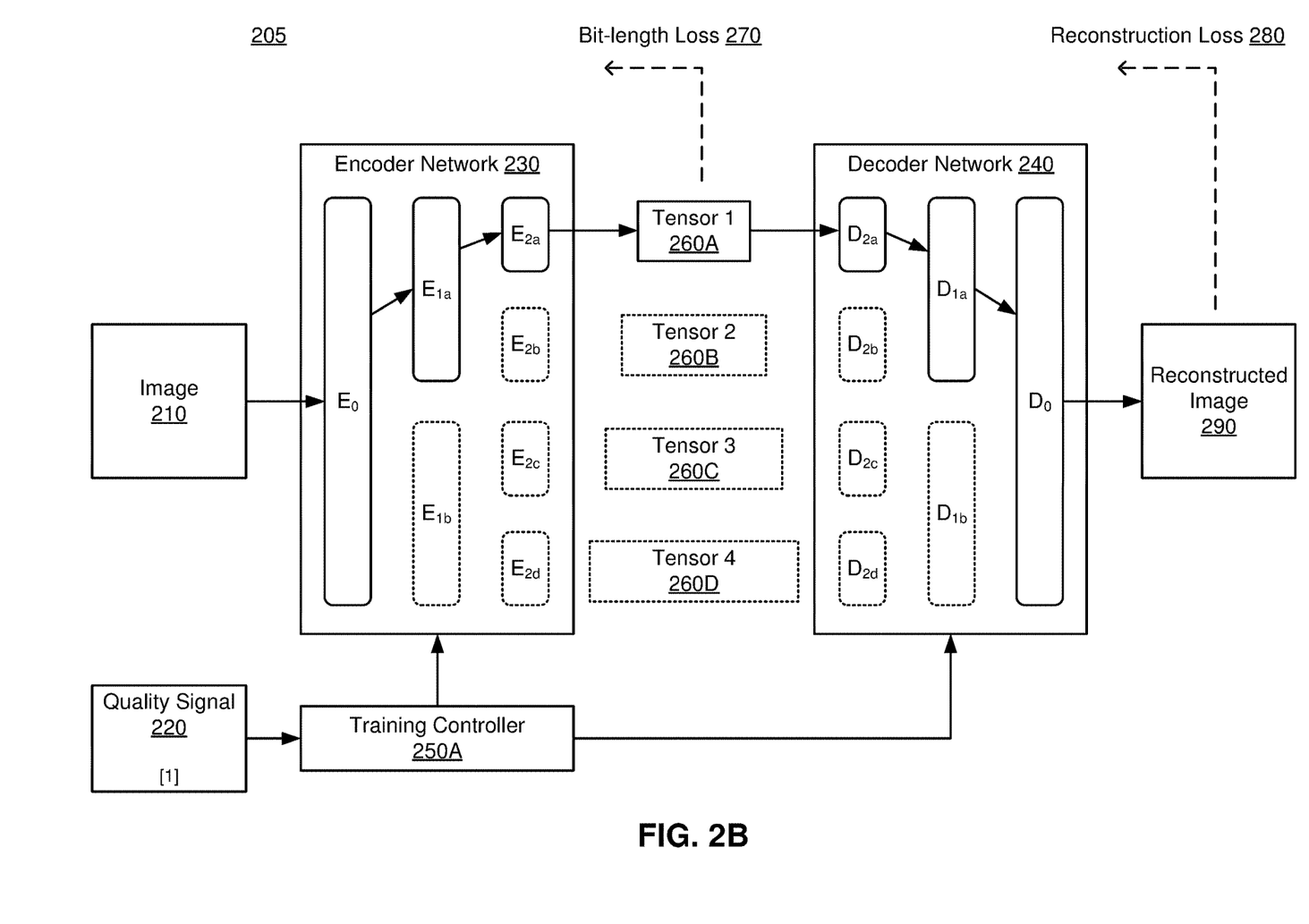
FIG. 2B illustrates a process for training the autoencoder using a reduced amount of sub-networks, in accordance with an embodiment.

FIG. 2B illustrates a process for training the autoencoder 205 using a reduced amount of sub-networks, in accordance with an embodiment. In particular, FIG. 2B illustrates an instance in which the autoencoder 205 is being trained to encode and decode an image 210 with only those sub-networks of the encoder network 230 and the decoder network 240 that are associated with tensor 1 260A. The quality signal 220 indicates that only tensor 1 260A should be used to train the parameters of the encoder network 230 and the decoder network 240. The training controller 250A notifies the encoder network 230 and the decoder network 240 that they should not use sub-networks associated with the other tensors 260B-D and that they should not update any parameters for the other tensors 260B-D during the current training step. In one embodiment, the training controller 250A also indicates to a bitstream generator which tensors 260 to compress into a bitstream for calculating the bit-length loss 270.

The decoder network 240 uses the sub-networks associated with tensor 1 260A to generate a reconstructed image 290. A reconstruction loss 280 function is generated based on the reconstructed image 290. During the backpropagation step, the bit-length loss 270 and the reconstruction loss 280 are used to adjust the parameters of the sub-networks associated with tensor 1 260A.

Figure 2C:
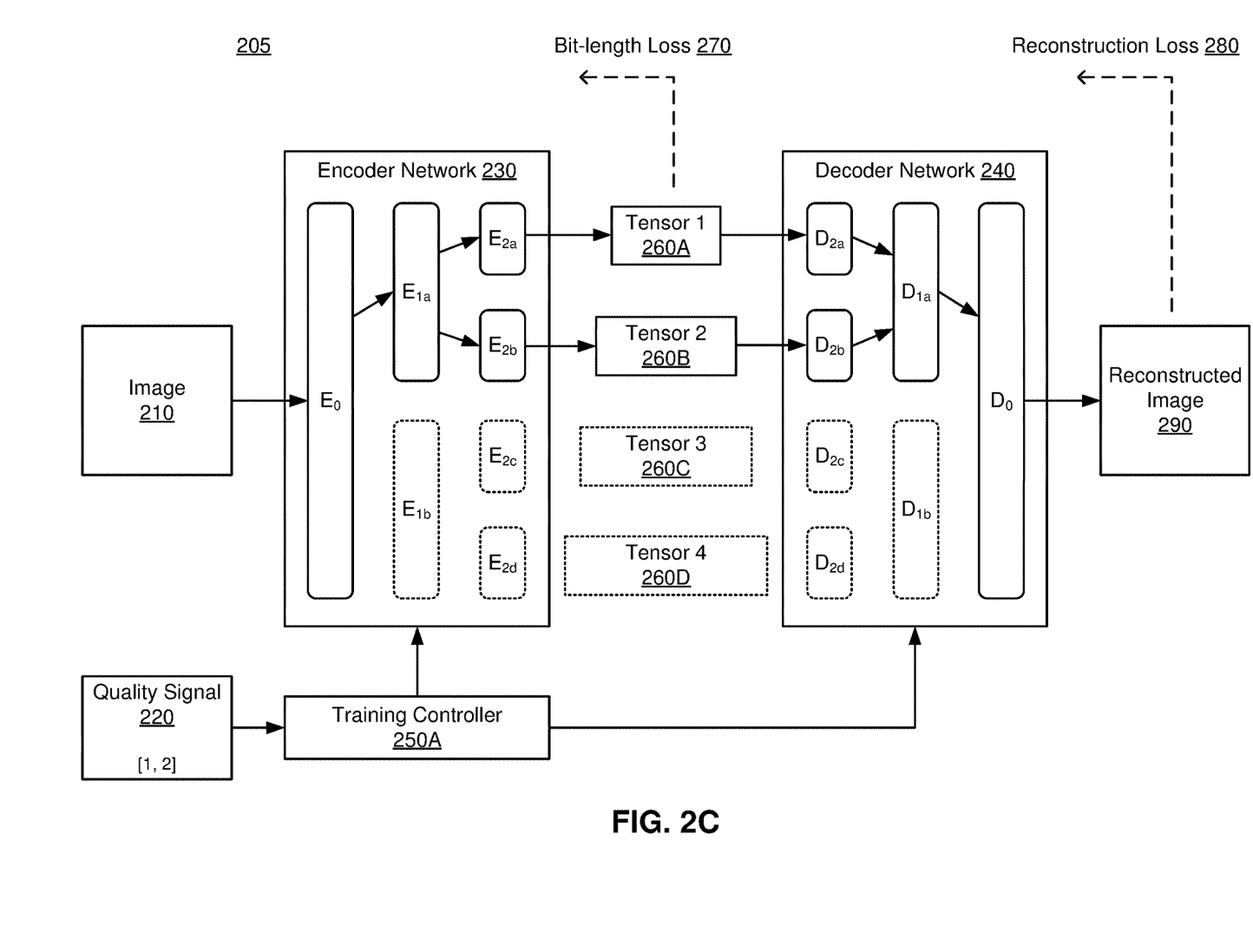
FIG. 2C illustrates a process for training the autoencoder 205 using a reduced amount of sub-networks, in accordance with an embodiment.

FIG. 2C illustrates a process for training the autoencoder 205 using a reduced amount of sub-networks, in accordance with an embodiment. FIG. 2C illustrates a training instance in which the autoencoder 250 is being trained to encode and decode an image 210 using subnetworks that are associated with tensor 1 260A and tensor 2 260B. Using both tensor 1 260A and tensor 2 260B increases the amount of image data that is included in a compressed bitstream, as compared to the case of FIG. 2B in which only tensor 1 260A is trained. The quality signal 220 indicates that tensor 1 260A and tensor 2 260B should be used to train the parameters of the encoder network 230 and the decoder network 240. The training proceeds as in the descriptions of FIG. 2A and FIG. 2B. That is, the bit-length loss 270 and the reconstruction loss 280 are determined using the paths through the network that are associated with the selected tensors 260 and parameters of the subnetworks along those paths are updated accordingly during a backpropagation step.

Figure 2D:
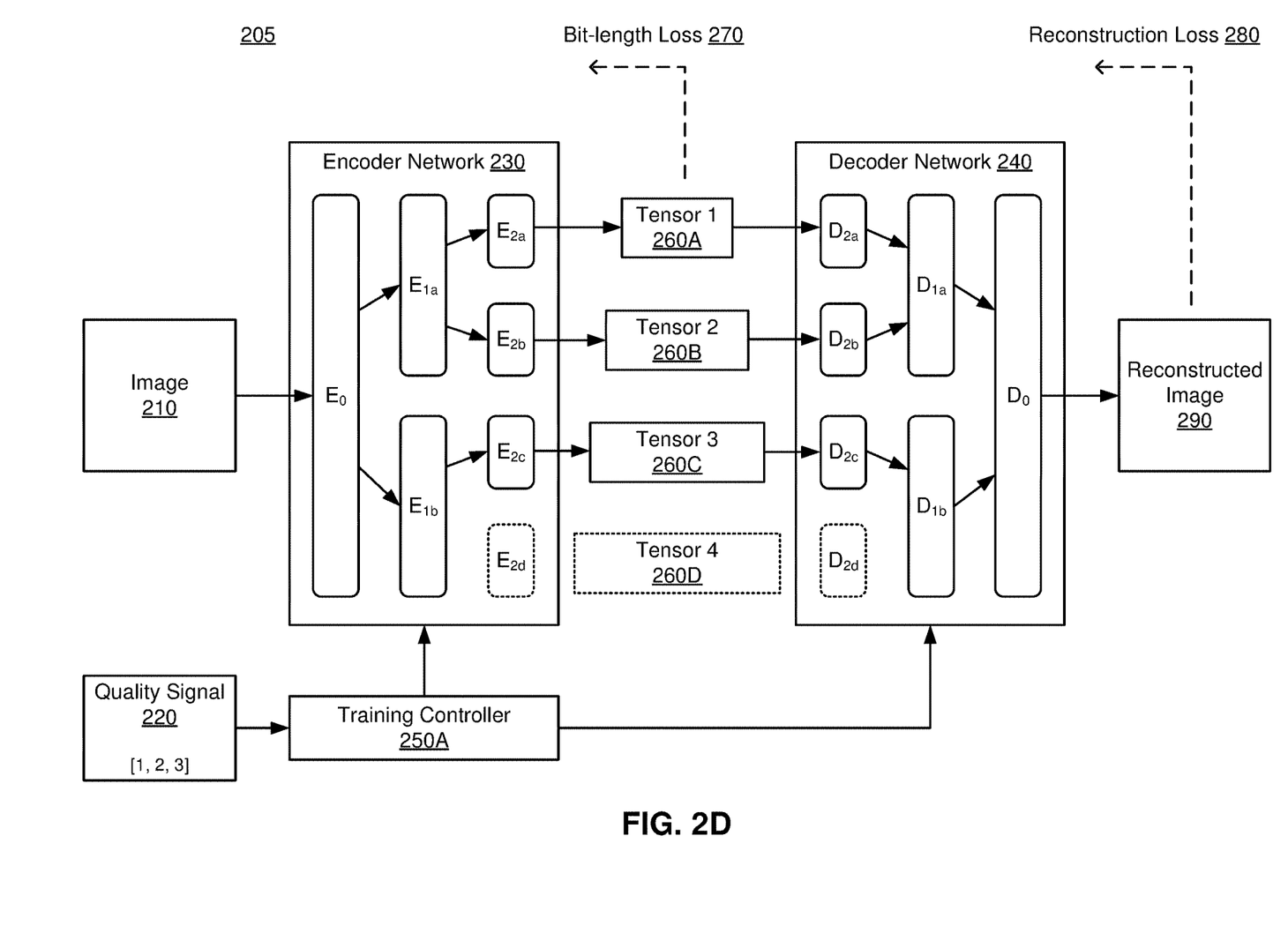
FIG. 2D illustrates still another a process for training the autoencoder 205 using a reduced amount of sub-networks, in accordance with an embodiment.

FIG. 2D illustrates still another a process for training the autoencoder 205 using a reduced amount of sub-networks, in accordance with an embodiment. The example of FIG. 2D illustrates a training instance in which the autoencoder 250 is being trained to encode and decode an image 210 using subnetworks that are associated with tensor 1 260A, tensor 2 260B, and tensor 3 260C, but not using tensor 4 260D. The training proceeds as described in the previous examples in which the selected paths through the network are used to generate a bit-length loss 270 and a reconstruction loss 280 and the parameters of the subnetworks on the selected paths are adjusted during the backpropagation step.

In some embodiments, some training steps may include training paths through subnetworks associated with each of the tensors 260 independently from the paths through the other tensors 260. That is, rather than training the autoencoder 205 to increase the quality of an encoding by increasing the number of tensors 260 used to produce a bitstream, in some cases, the autoencoder 205 may be trained such that some or all of the network paths associated with individual tensors 260 can produce tensor information for encoding the image 210. In some embodiments, the tensors 260 may be different sizes, for example, the subnetworks associated with tensor 4 260D may produce more data than the subnetworks associated with tensor 1 260A, and the tensors may consequently be trained to independently encode content data at different quality levels.

Figure 2E:
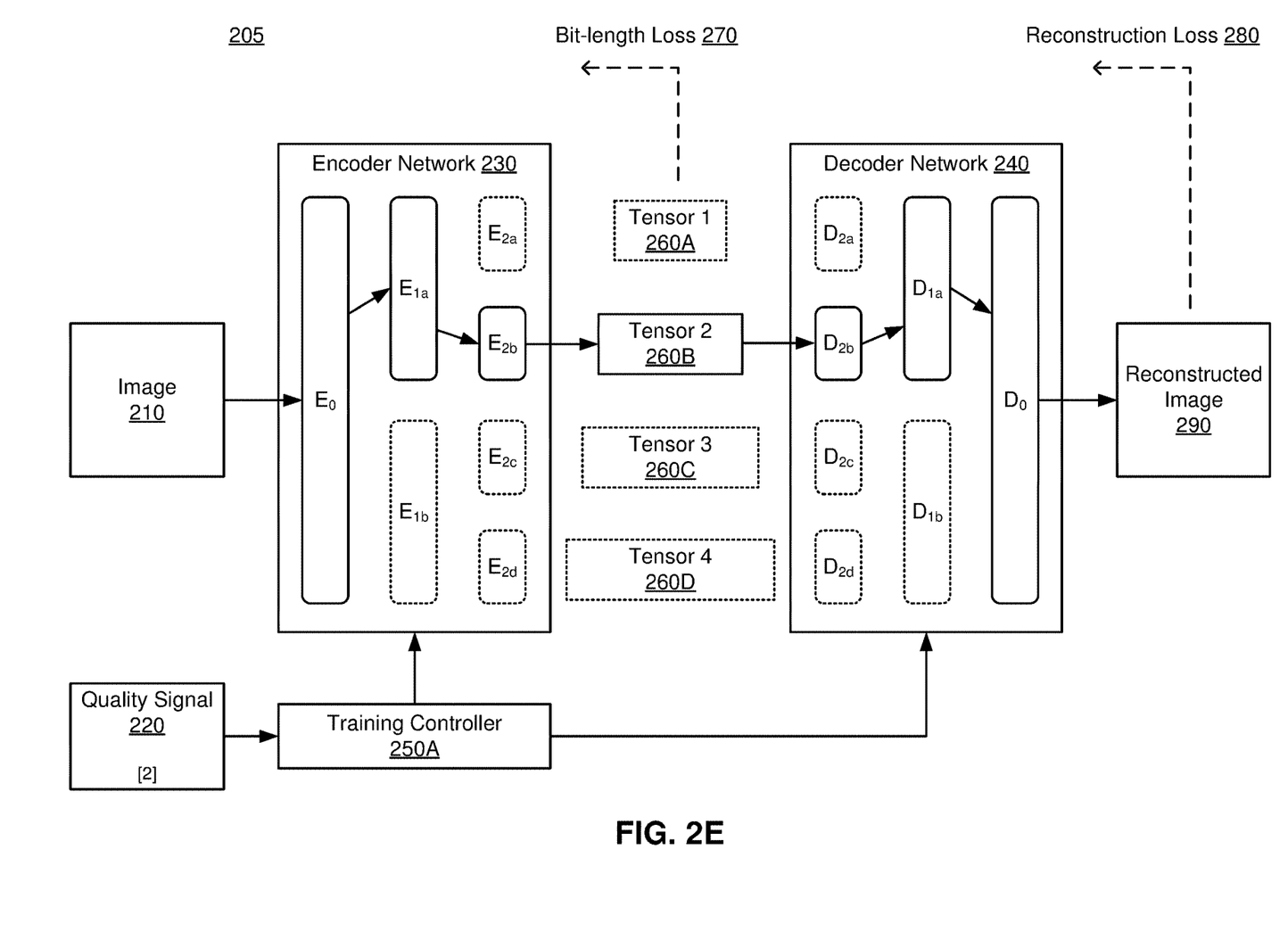
FIG. 2E illustrates a process for training the autoencoder 205 using sub-networks associated with one tensor 260, in accordance with an embodiment.

FIG. 2E illustrates a process for training the autoencoder 205 using sub-networks associated with one tensor 260, in accordance with an embodiment. In particular, FIG. 2E shows an instance in which a quality signal 220 indicates that only those sub-networks of the encoder network 230 and the decoder network 240 that are associated with tensor 2 260B should be active during training. The training controller 250A notifies the encoder network 230 and the decoder network 280 to indicate that sub-networks of the encoder network 230 or the decoder network 240 that are not needed to encode and decode information from tensor 2 260B should not be used during the training. The selected path through the encoder network 230 is used to encode the training image 210 and a bitstream generator is used to produce a bit-length loss 270 based on tensor 2 260B. The decoder network 240 generates a reconstructed image 290 that is used to produce a reconstruction loss 280. The parameters of sub-networks along the network path associated with tensor 2 260B are updated during the backpropagation step based on the reconstruction loss 280 and the bit-stream loss 270.

Figure 2F:
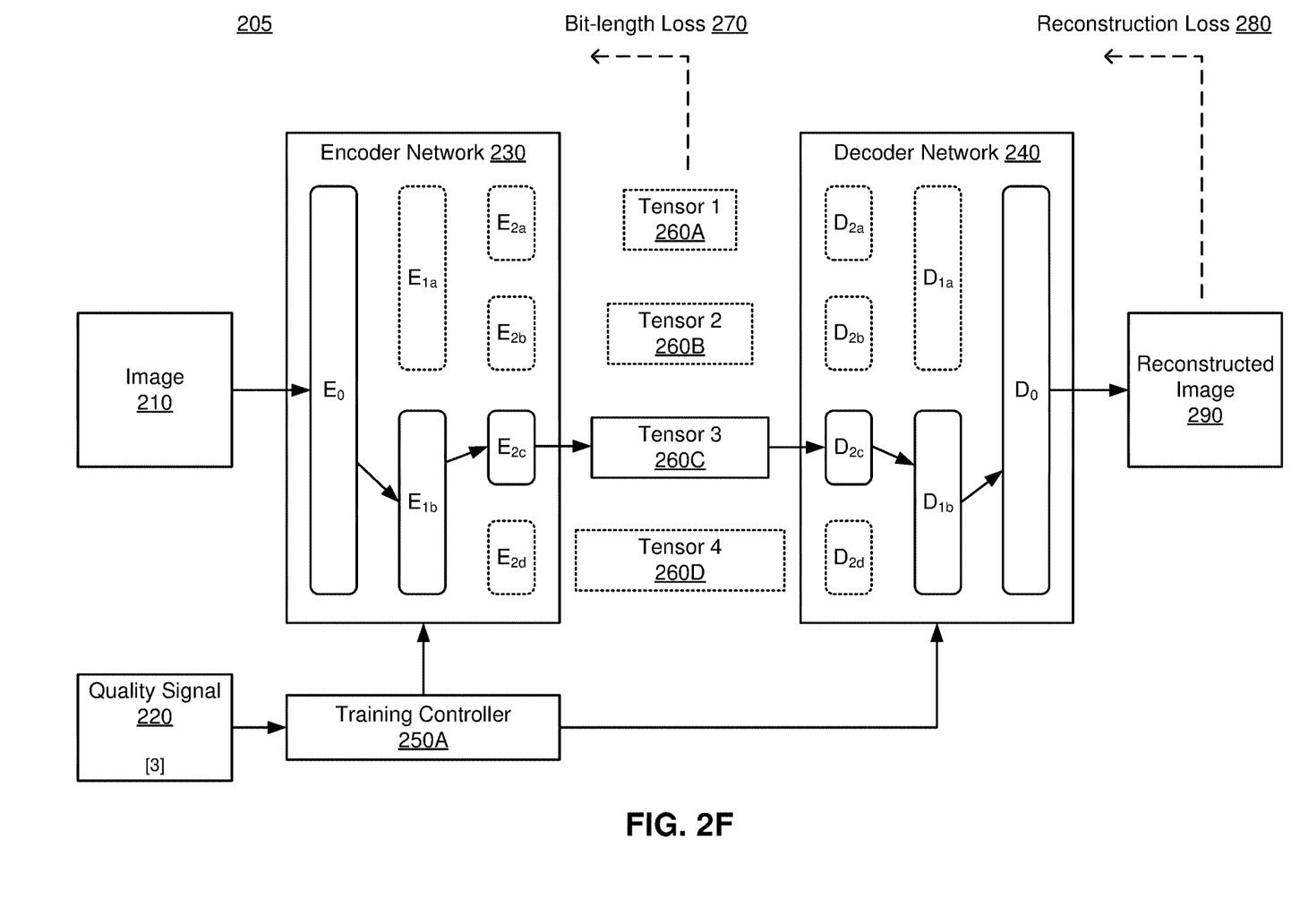
FIG. 2F illustrates a process for training the autoencoder using sub-networks associated with one tensor, in accordance with an embodiment.
Figure 2G:
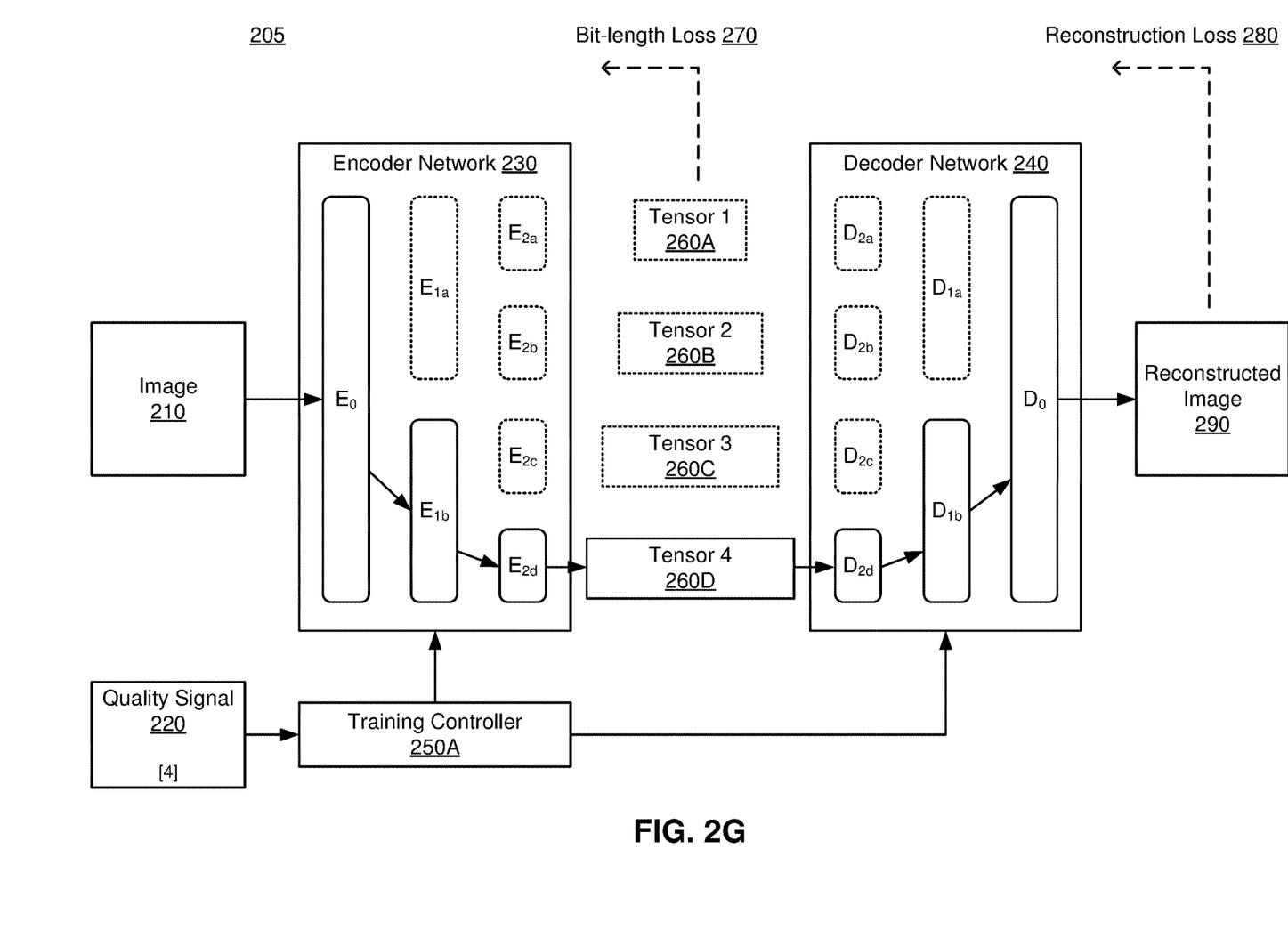
FIG. 2G illustrates a process for training the autoencoder using sub-networks associated with one tensor, in accordance with an embodiment.

FIG. 2F and FIG. 2G illustrate processes for training the autoencoder 205 using sub-networks associated with one tensor 260, in accordance with an embodiment. FIG. 2F demonstrates the sub-networks along paths associated with tensor 3 260C being trained to encode an image 210 independently from the other tensors 260. FIG. 2G similarly demonstrates the sub-networks along paths associated with tensor 4 260D being trained to encode an image 210 independently from the other tensors 260. The training process for the instances of FIGS. 2F and 2G are similar to the training process shown in FIG. 2E, as described previously.

Training the autoencoder 205 may include some or all of the different training scenarios described in FIGS. 2A-G. The combination of training scenarios which isolate groups of one or more tensors 260 may produce an autoencoder 205 in which the shared sub-networks of the encoder network 230 and decoder network 240 (e.g. $E_0$ and $D_0$) will tend to include parameters that are needed by all of the tensors 260 and in which parameters may be more specialized for sub-networks that are only associated with a subset of the tensors 260 (e.g., $E_{1a}$ and $E_{2d}$). In various embodiments, additional or different combinations of network paths may be used for training the autoencoder 205, although not all possible combinations are described herein.

Figure 3A:
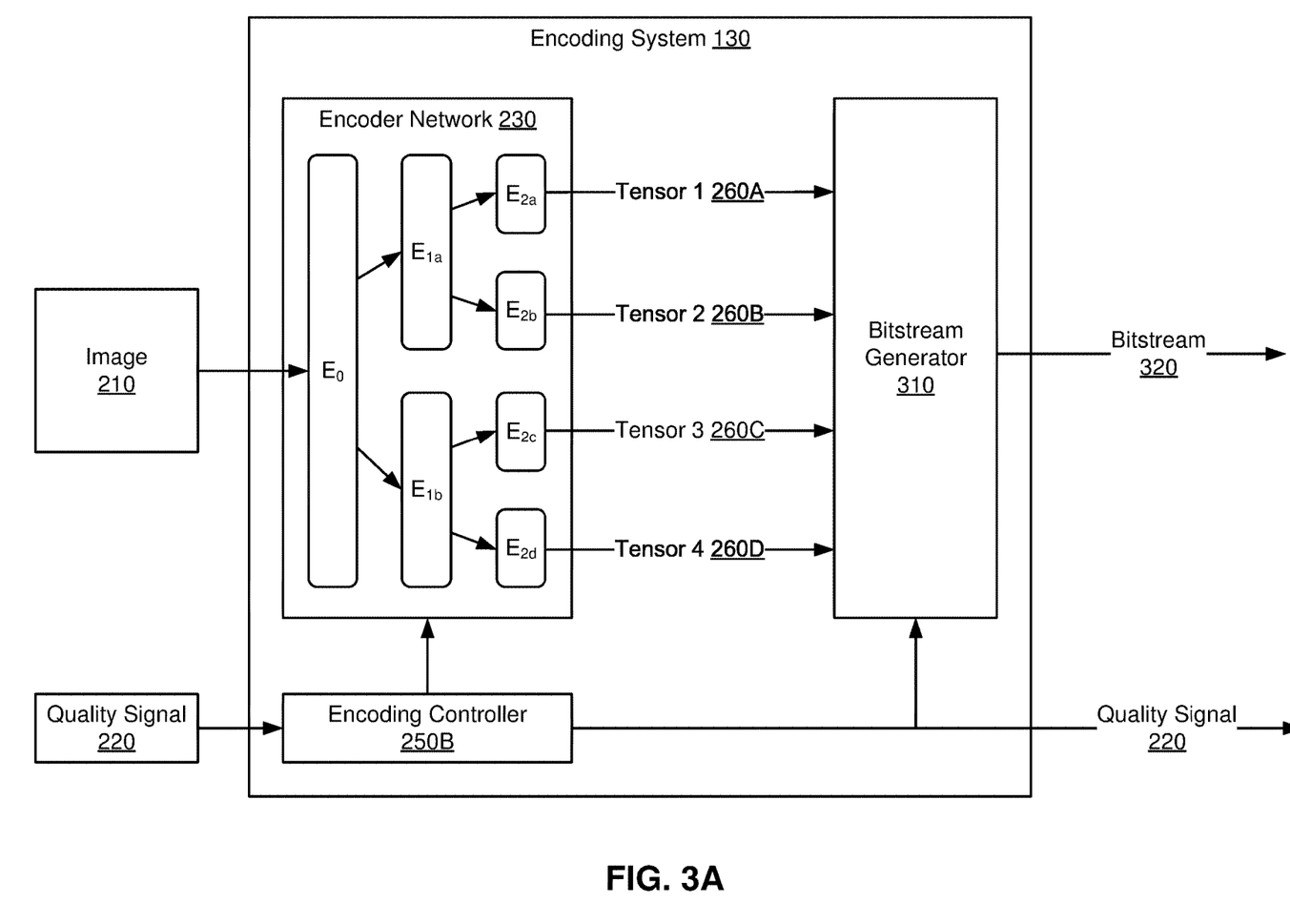
FIG. 3A illustrates a deployment process for the encoding system, in accordance with an embodiment.

FIG. 3A illustrates a deployment process for the encoding system, in accordance with an embodiment. After the training process for the autoencoder 205 is complete, the encoding system 130 and decoding system 140 may be deployed their respective systems for use in encoding and decoding content.

The encoding system 130 receives a content item (e.g., an image 210) and a quality signal 220 as input. In one embodiment, an encoding controller 250B receives the quality signal 220 and determines which tensors 260 the encoding system 130 should use to encode the image 210 in view of the indicated desired quality. In various embodiments, the encoding controller 250B may notify or otherwise configure the encoder network 230 to use the sub-networks that correspond to the determined set of tensors 260. The encoder network 230 generates the one or more tensors 260 accordingly. In one embodiment, the encoder network may generate all possible tensors 260. In another embodiment, the encoder network 230 may generate only those tensors 260 that the encoding controller 250 indicated based on the quality signal 220.

The bitstream generator 310 generates a bitstream from the tensor data. In cases where multiple tensors 260 are used to encode data about the image 210, the bitstream generator 310 concatenates or otherwise combines the relevant tensors 260. In one embodiment, the bitstream generator may receive the quality signal 220, for example, for the encoding controller 250B and may use the quality signal to determine which tensor 260 information should be included in a bitstream 320. The combined tensor data is compressed into a bitstream 320 and sent over the network 120 or stored in a datastore 150 for later decoding. In some embodiments, the quality signal 220 is sent over the network 120 or stored in the datastore 150 in association with the bitstream 320. The quality signal 220 may be included as data in the compressed bitstream, in another embodiment.

Figure 3B:
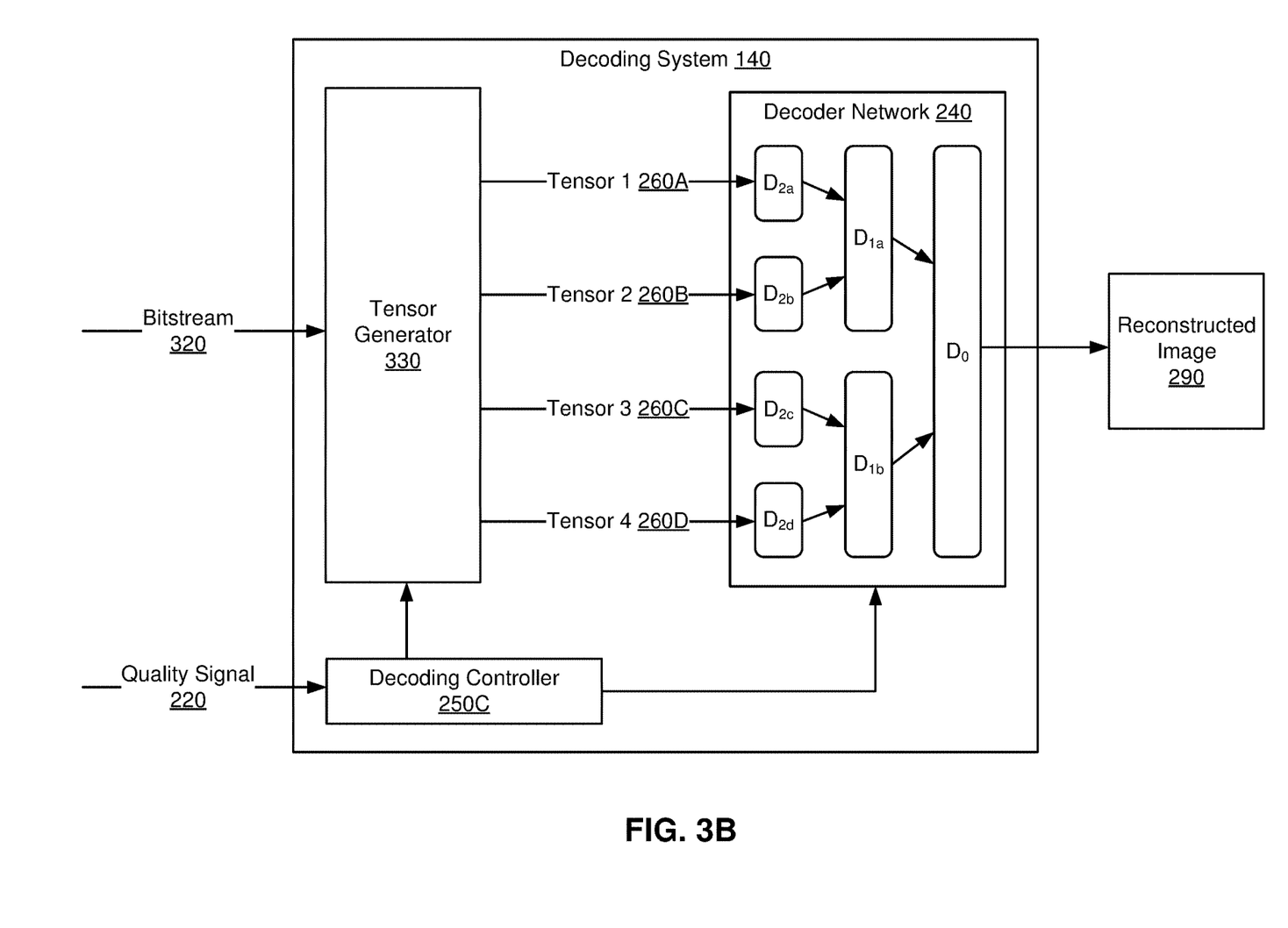
FIG. 3B illustrates a deployment process for the decoding system, in accordance with an embodiment.

FIG. 3B illustrates a deployment process for the decoding system, in accordance with an embodiment. The decoding system receives a bitstream 320 and may additionally receive a quality signal 220. The decoding system 140 includes a tensor generator 330, the trained decoder network 240, and may include a decoding controller 250C.

The tensor generator 330 is configured to be able to decompress and deconstruct the bitstream 320 generated by the bitstream generator 310 of the encoding system 130. The tensor generator 330 decompresses the bitstream 320 and separates it into the component tensors 260. In some cases, the decoding controller 250C may provide information about the quality signal 220 to the tensor generator 330 to indicate to the tensor generator 330 which subset of tensors 260 were used to encode the content, and consequently, which tensors 260 to provide to the decoder network 240. In some embodiments, the tensor generator 330 may be configured to determine which tensors were used to encode the content based on the length of the bitstream 320, and without additional information about the quality signal 220.

The tensor generator 330 provides the reproduced tensors 260 to the decoder network 240. In one embodiment, the decoding controller 250C configures the decoder network 240 such that it only activates the sub-networks associated with the tensors 260 that were used to encode the content, as indicated by the quality signal 220. The decoder network 240 generates a reconstructed image 290.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. An encoding system stored on a non-transitory computer readable storage medium, wherein the encoding system is manufactured by a process comprising:
obtaining training content that comprises a plurality of examples;
initializing an autoencoder that comprises:
an encoding portion that comprises a neural network having a plurality of paths, where the encoding portion receives an input and generates a plurality of tensors at each of the paths, wherein one or more sub-networks in the encoding portion are shared by the plurality of paths, and wherein each of the plurality of sub-networks in the encoding portion are associated with a respective path, and
a decoding portion that comprises a neural network having a plurality of paths that correspond to the paths of the encoding portion, where the decoding portion receives the plurality of tensors at the corresponding plurality of paths and reconstructs the input therefrom, wherein one or more sub-networks in the encoding portion are shared by the plurality of paths, and wherein each of the plurality of sub-networks in the encoding portion are associated with a respective path;

for each of a plurality of the examples of the training content:

selecting a quality level indicating a required quality of reconstructed input;

selecting one or more corresponding paths through the encoder and decoder portions of the autoencoder based on the selected quality level;

repeatedly backpropagating one or more error terms obtained from a loss function to update a set of parameters of the autoencoder, the backpropagating performed only through the selected paths, wherein the loss function comprises:

a reconstruction loss indicating a dissimilarity between the input and the reconstructed input, and an encoding loss indicating a length of a bitstream generated by compressing information about the one or more tensors output by the encoding portion; and storing the set of parameters of the encoding portion of the autoencoder on the computer readable storage medium as parameters of the encoding system, wherein the encoding system is configured to receive an input and produce one or more tensors using the stored parameters, and where the encoding system further comprises a bitstream generator that is coupled to output a compressed bitstream representing the one or more tensors generated by the encoding system using the stored parameters.

2. The encoding system of claim 1, wherein the paths of the encoding portion are organized in a branching structure, and wherein the paths of the decoding portion are organized into a corresponding branching structure.

3. The encoding system of claim 1, wherein the quality level indicates a random combination of a plurality of paths through the encoder and decoder portions of the autoencoder to use to encode the training content.

4. The encoding system of claim 1, wherein the quality level further indicates which of the paths through the encoder and decoder portions of the autoencoder to apply to the training content for generating the loss function.

5. The encoding system of claim 1, wherein input to the encoding system includes images.

6. The encoding system of claim 1, wherein input to the encoding system includes frames of a video.

7. The encoding system of claim 1, wherein the encoding portion of the autoencoder stored on the computer readable storage medium further includes an encoding controller that is coupled to identify which of the one or more produced tensors to include in the compressed bitstream based on the quality level.

8. The encoding system of claim 1, wherein generating the bitstream comprises combining the one or more tensors and compressing the combination.

9. The encoding system of claim 8, wherein combining the one or more tensors includes combining the quality level with the one or more tensors.

10. The encoding system of claim 1, wherein the quality level may be in the form of a tensor that indicates a plurality of quality level values for use in encoding the input, each of the quality level values associated with a different portion of the input.

11. The encoding system of claim 1, wherein selecting a quality level comprises determining a quality level that will maximize a reconstruction quality for a given target bandwidth.

12. The encoding system of claim 1, wherein selecting a quality level comprises determining a quality level that will minimize an amount of bandwidth required for a given target reconstruction quality.

13. A decoding system stored on a non-transitory computer readable storage medium, wherein the decoding system is manufactured by a process comprising:

obtaining training content that comprises a plurality of examples;

initializing an autoencoder that comprises:

an encoding portion that comprises a neural network having a plurality of paths, where the encoding portion receives an input and generates a plurality of tensors at each of the paths, wherein one or more sub-networks in the encoding portion are shared by the plurality of paths, and wherein each of the plurality of sub-networks in the encoding portion are associated with a respective path, and a decoding portion that comprises a neural network having a plurality of paths that correspond to the paths of the encoding portion, where the decoding portion receives the plurality of tensors at the corresponding plurality of paths and reconstructs the input therefrom, wherein one or more sub-networks in the encoding portion are shared by the plurality of paths, and wherein each of the plurality of sub-networks in the encoding portion are associated with a respective path;

for each of a plurality of the examples of the training content:

selecting a quality level indicating a required quality for the reconstructed input;

selecting one or more corresponding paths through the encoder and decoder portions of the autoencoder based on the selected quality level;

repeatedly backpropagating one or more error terms obtained from a loss function to update a set of parameters of the autoencoder, the backpropagating performed only through the selected paths, wherein the loss function comprises:

a reconstruction loss indicating a dissimilarity between the input and the reconstructed input, and an encoding loss indicating a length of a bitstream generated by compressing information about the one or more tensors output by the encoding portion; and storing the set of parameters of the decoding portion of the autoencoder on the computer readable storage medium as parameters of the decoding system, wherein the decoding system comprises a tensor generator that is configured to receive and decompress a compressed bitstream comprising one or more tensors representing an input, and where the decoding portion is configured to receive the one or more tensors and generate a reconstruction of the input therefrom using the stored parameters.

14. The decoding system of claim 13, wherein the paths of the encoding portion are organized in a branching structure, and wherein the paths of the decoding portion are organized into a corresponding branching structure.

15. The decoding system of claim 13, wherein the quality level indicates a random combination of a plurality of paths through the encoder and decoder portions of the autoencoder to use to encode the training content.

16. The decoding system of claim 13, wherein the quality level further indicates which of the paths through the encoder and decoder portions of the autoencoder to apply to the training content for generating the loss function.

17. The decoding system of claim 13, wherein output of the decoding system includes images.

18. The decoding system of claim 13, wherein output of the decoding system includes frames of a video.

19. The decoding system of claim 13, wherein the decoding portion of the autoencoder stored on the computer readable storage medium further includes a decoding controller that is coupled to identify which of the one or more received tensors to input into the decoding portion for generating the reconstruction.

20. The decoding system of claim 13, wherein generating the bitstream comprises combining the one or more tensors and compressing the combination.

21. The decoding system of claim 20, wherein combining the one or more tensors includes combining the quality level with the one or more tensors.

22. The decoding system of claim 13, wherein the quality level may be in the form of a tensor that indicates a plurality of quality level values for use in encoding the input, each of the quality level values associated with a different portion of the input.

23. The decoding system of claim 13, wherein selecting a quality level comprises determining a quality level that will maximize a reconstruction quality for a given target bandwidth.

24. The decoding system of claim 13, wherein selecting a quality level comprises determining a quality level that will minimize an amount of bandwidth required for a given target reconstruction quality.

25. A method for generating an encoding system, comprising:
    obtaining training content that comprises a plurality of examples;
    initializing an autoencoder that comprises:
        an encoding portion that comprises a neural network having a plurality of paths, where the encoding portion receives an input and generates a plurality of tensors at each of the paths, wherein one or more sub-networks in the encoding portion are shared by the plurality of paths, and wherein each of the plurality of sub-networks in the encoding portion are associated with a respective path, and
        a decoding portion that comprises a neural network having a plurality of paths that correspond to the paths of the encoding portion, where the decoding portion receives the plurality of tensors at the corresponding plurality of paths and reconstructs the input therefrom, wherein one or more sub-networks in the encoding portion are shared by the plurality of paths, and wherein each of the plurality of sub-networks in the encoding portion are associated with a respective path;
    for each of a plurality of the examples of the training content:
        selecting a quality level indicating a required quality of reconstructed input;
        selecting one or more corresponding paths through the encoder and decoder portions of the autoencoder based on the selected quality level;
        repeatedly backpropagating one or more error terms obtained from a loss function to update a set of parameters of the autoencoder, the backpropagating performed only through the selected paths, wherein the loss function comprises:
            a reconstruction loss indicating a dissimilarity between the input and the reconstructed input, and
            an encoding loss indicating a length of a bitstream generated by compressing information about the one or more tensors output by the encoding portion; and
    storing the set of parameters of the encoding portion of the autoencoder as parameters of the encoding system, wherein the encoding system is configured to receive an input and produce one or more tensors using the stored parameters, and where the encoding system further comprises a bitstream generator that is coupled to output a compressed bitstream representing the one or more tensors generated by the encoding system using the stored parameters.

26. A method for generating a decoding system, comprising:
    obtaining training content that comprises a plurality of examples;
    initializing an autoencoder that comprises:
        an encoding portion that comprises a neural network having a plurality of paths, where the encoding portion receives an input and generates a plurality of tensors at each of the paths, wherein one or more sub-networks in the encoding portion are shared by the plurality of paths, and wherein each of the plurality of sub-networks in the encoding portion are associated with a respective path, and
        a decoding portion that comprises a neural network having a plurality of paths that correspond to the paths of the encoding portion, where the decoding portion receives the plurality of tensors at the corresponding plurality of paths and reconstructs the input therefrom, wherein one or more sub-networks in the encoding portion are shared by the plurality of paths, and wherein each of the plurality of sub-networks in the encoding portion are associated with a respective path;
    for each of a plurality of the examples of the training content:
        selecting a quality level indicating a required quality for the reconstructed input;
        selecting one or more corresponding paths through the encoder and decoder portions of the autoencoder based on the selected quality level;
        repeatedly backpropagating one or more error terms obtained from a loss function to update a set of parameters of the autoencoder, the backpropagating performed only through the selected paths, wherein the loss function comprises:
            a reconstruction loss indicating a dissimilarity between the input and the reconstructed input, and
            an encoding loss indicating a length of a bitstream generated by compressing information about the one or more tensors output by the encoding portion; and
    storing the set of parameters of the decoding portion of the autoencoder as parameters of the decoding system, wherein the decoding system comprises a tensor generator that is configured to receive and decompress a compressed bitstream comprising one or more tensors representing an input, and where the decoding portion is configured to receive the one or more tensors and generate a reconstruction of the input therefrom using the stored parameters.

* * * * *